United States Patent
Mashimo

(10) Patent No.: US 7,120,110 B2
(45) Date of Patent: Oct. 10, 2006

(54) SIGNAL PROCESSING CIRCUIT FOR NOISE ELIMINATION AND DEMODULATOR CIRCUIT USING THE SAME FOR ACCURATE DEMODULATION

(75) Inventor: Akira Mashimo, Tokorozawa (JP)

(73) Assignee: TEAC Corporation, (JP)

( * ) Notice: Subject to any disclaimer, the term of this patent is extended or adjusted under 35 U.S.C. 154(b) by 969 days.

(21) Appl. No.: 10/235,234

(22) Filed: Sep. 4, 2002

(65) Prior Publication Data
US 2003/0055637 A1    Mar. 20, 2003

(30) Foreign Application Priority Data
Sep. 17, 2001    (JP) ............... 2001-281778

(51) Int. Cl.
*G11B 5/09*    (2006.01)
(52) U.S. Cl. .................... 369/124.15; 369/124.01; 369/59.1
(58) Field of Classification Search ............. None
See application file for complete search history.

(56) References Cited

U.S. PATENT DOCUMENTS 5,963,582 A * 10/1999 Stansell, Jr. ............... 375/148
6,002,708 A * 12/1999 Fleming et al. ............. 375/130

OTHER PUBLICATIONS

Patent Abstracts of Japan—Publication No. 2001-243726 (2 pages)
TEP010801A:070857 (Feb. 18, 1928) (in Japanese) (1 page).
2001-243726(P2001-243726A)(in Japanese) (21 pages).

* cited by examiner

*Primary Examiner*—Muhammad Edun
(74) *Attorney, Agent, or Firm*—Anderson Kill & Olick, PC

(57) ABSTRACT

A signal processing circuit for eliminating noise from an input binary signal includes a measurement part and a signal output part. The measurement part measures the cumulative period of time of at least one of high-level and low-level states of the input binary signal for a predetermined period of time after the polarity of the input binary signal is inverted. The signal output part outputs at least one of high-level and low-level signals in accordance with the cumulative period of time.

10 Claims, 11 Drawing Sheets

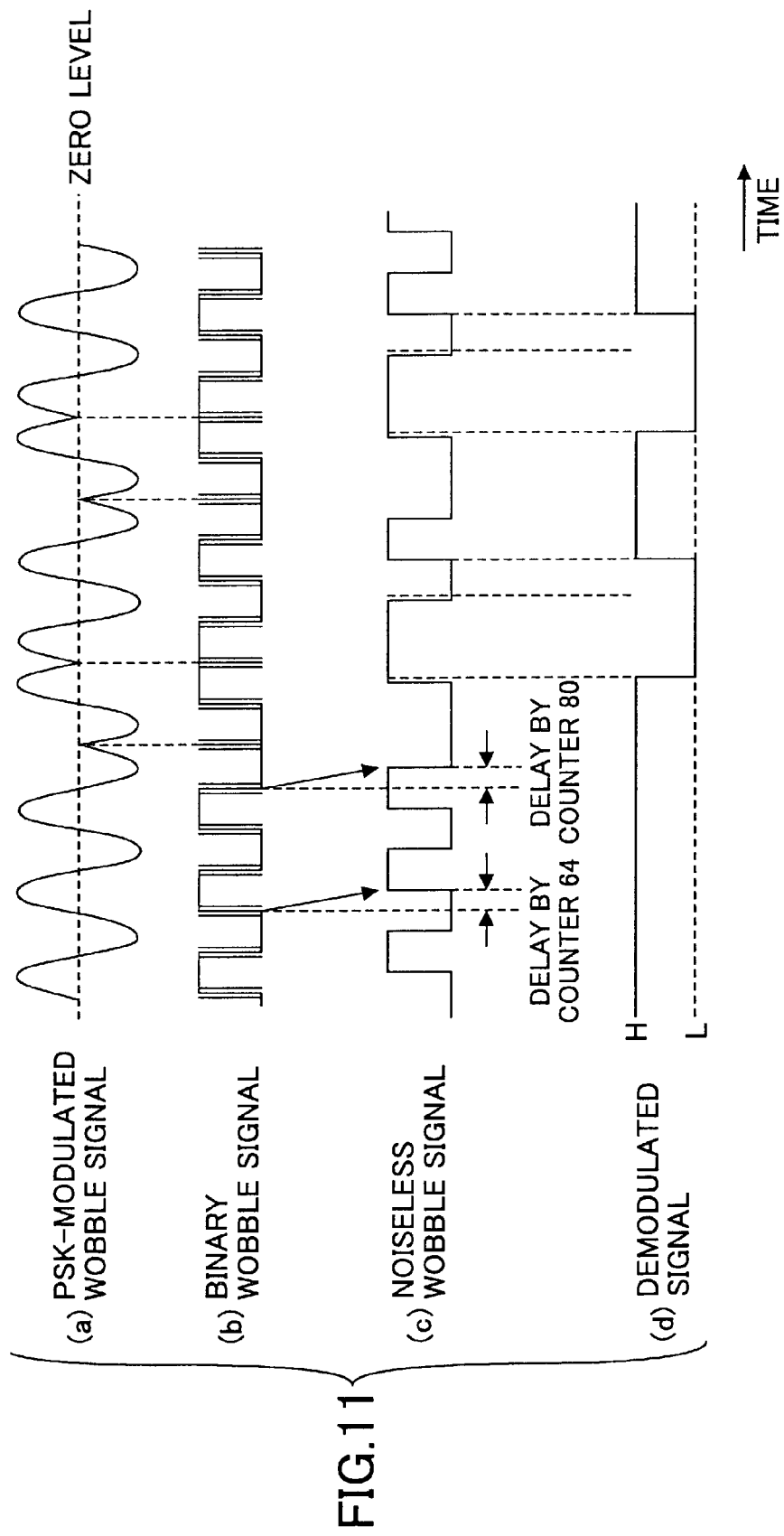

SIGNAL PROCESSING CIRCUIT FOR NOISE ELIMINATION AND DEMODULATOR CIRCUIT USING THE SAME FOR ACCURATE DEMODULATION

BACKGROUND OF THE INVENTION

1. Field of the Invention

The present invention generally relates to signal processing circuits and demodulator circuits, and more particularly to a signal processing circuit for eliminating noise from an input signal obtained as a result of binarizing, or converting into binary form, a PSK (phase shift keying)-modulated wobble signal and to a demodulator circuit for demodulating the wobble signal.

2. Description of the Related Art

Conventionally, tracks provided for information recording and reproduction on a recording-type optical disk such as a CD (compact disk) or a DVD (digital versatile disk) meander radially to form a wobble. An optical disk unit includes an optical head that opposes the surface of the disk attached to the optical disk unit. The optical head records information on the disk by emitting a laser beam thereonto, and outputs a reproduction signal corresponding to information recorded on the disk by receiving a reflected light therefrom. The information reproduced by the optical head includes a signal resulting from the wobble formed on the disk. Hereinafter, this signal is referred to as a wobble signal. The optical disk unit extracts the wobble signal from the information reproduced by the optical head.

The wobble is formed sinusoidally on the disk in accordance with digital address information indicating positions on the disk. Therefore, the wobble signal extracted by using the optical head has a sinusoidal waveform. Accordingly, in order to obtain the address information indicating positions on the disk, it is necessary to convert the sinusoidal wobble signal accurately to digital data.

FIG. 1 is a block diagram showing a conventional signal processing circuit 100 for converting the sinusoidal wobble signal to a digital signal. FIG. 2 is a timing chart of signals in the signal processing circuit 100 of FIG. 1. As shown in FIG. 1, the signal processing circuit 100 includes an edge detector circuit 102. The sinusoidal wobble signal extracted by using the optical head is supplied to the edge detector circuit 102 as indicated by (a) of FIG. 2. The edge detector circuit 102 first compares the supplied sinusoidal wobble signal with a zero level. Then, the edge detector circuit 102 generates a binary signal that is HIGH (at a high level) when the sinusoidal wobble signal is above the zero level and is LOW (at a low level) when the sinusoidal wobble signal is below the zero level as indicated by (b) of FIG. 2. Thereafter, the edge detector circuit 102 generates a pulse-like edge signal corresponding to the rising and falling edges of the binary signal as indicated by (c) of FIG. 2.

As shown in FIG. 1, a counter circuit 104, a latch circuit 106, and a digital low-pass filter (LPF) 108 are connected to the edge detector circuit 102. The edge signal generated in the edge detector circuit 102 is supplied to the counter circuit 104, the latch circuit 106, and the digital LPF 108. A reference clock signal is supplied to the counter circuit 104. The counter circuit 104 counts the number of reference clock pulses, and is cleared to zero, or sets the count value of the reference clock pulses to zero, as indicated by (d) of FIG. 2 when the edge signal is supplied from the edge detector circuit 102 to the counter circuit 104.

The counter circuit 104 is connected to the latch circuit 106. The counter circuit 104 supplies its count value to the latch circuit 106. The latch circuit 106 latches the count value when the edge signal is supplied from the edge detector circuit 102 to the latch circuit 106. The latch circuit 106 is connected to the digital LPF 108. The digital LPF 108 is supplied with the count value that is supplied to the latch circuit 106. When the edge signal is supplied from the edge detector circuit 102 to the digital LPF 108, the digital LPF 108 performs digital low-pass filtering on the count value supplied from the latch circuit 106 so as to eliminate noise components from the count value. The signal processed in the digital LPF 108 is demodulated so that the address information converted to the wobble signal is extracted.

FIG. 3 is a diagram showing a variation over time of the sinusoidal wobble signal resulting from the wobble formed on the disk, the sinusoidal wobble signal being extracted in the optical disk unit. FIG. 4 is a diagram showing a variation over time of the wobble signal extracted in the optical, disk unit when the wobble formed on the disk is PSK-modulated in accordance with the address information of the disk.

Normally, noise is superimposed on the sinusoidal wobble signal resulting from the wobble formed on the disk. Therefore, the wobble signal crosses the zero level a plurality of times near the crossing points of the wobble signal and the zero level as shown in FIG. 3. If the wobble is PSK-modulated, in some cases, the wobble signal based on the PSK-modulated wobble, at the time of phase inversion, goes above the zero level when the wobble signal should be maintained at or below the zero level or goes below the zero level when the wobble signal should be maintained at or above the zero level as shown in FIG. 4.

Accordingly, in the configuration of binarizing the wobble signal by comparing the wobble signal with the zero level and extracting the address information converted to the wobble signal based on the number of the rising and falling edges of the binary wobble signal as in the conventional signal processing circuit 100, the number of falling and rising edges is affected by the noise. Therefore, according to the above-described conventional method, it is difficult to detect the address information with accuracy based on the wobble signal.

SUMMARY OF THE INVENTION

Accordingly, it is a general object of the present invention to provide a signal processing circuit and a demodulator circuit in which the above-described disadvantage is eliminated.

A more specific object of the present invention is to provide a signal processing circuit that can detect the high-level and low-level states of an input binary signal with accuracy by eliminating noise components therefrom, and a demodulator circuit that can demodulate a phase-modulated signal with accuracy.

The above objects of the present invention are achieved by a signal processing circuit for eliminating noise from an input binary signal, the signal processing circuit including a measurement part measuring a cumulative period of time of at least one of high-level and low-level states of the input binary signal for a predetermined period of time after a polarity of the input binary signal is inverted, and a signal output part outputting at least one of high-level and low-level signals in accordance with the cumulative period of time.

According to the above-described signal processing circuit, the cumulative period of time of at least one of the high-level state and the low-level state of an input binary signal is measured for a predetermined period of time after the polarity of the input binary signal is inverted. At least one of high-level and low-level signals is output as an output signal based on the cumulative period of time. If the high-level (low-level) signal is output when the cumulative period of time of the high-level (low-level) state of the input binary signal reaches a certain value, noise resulting from signal level switching from LOW to HIGH (HIGH to LOW) can be eliminated. Further, if the cumulative period of time is measured only for the predetermined period of time after the inversion of the polarity of the input binary signal, noise resulting from phase inversion, for instance, can be eliminated. Thus, according to the present invention, the high-level and low-level periods of the input binary signal can be detected with accuracy by eliminating noise components from the input binary signal.

The above objects of the present invention are also achieved by a circuit for demodulating a phase-modulated signal, the circuit including: a binarization circuit converting the phase-modulated signal to a binary signal by using a predetermined level as a threshold; a measurement part measuring a cumulative period of time of at least one of high-level and low-level states of the binary signal for a predetermined period of time after a polarity of the binary signal is inverted; a signal generation part generating at least one of high-level and low-level signals in accordance with the cumulative period of time; and a polarity inversion part inverting a polarity of an output signal thereof in accordance with a pulse width of a signal output from said signal generation part.

According to the above-described circuit, a phase-modulated signal is converted to a binary signal, and the cumulative period of time of at least one of the high-level state and the low-level state of the binary signal is measured for a predetermined period of time after the polarity of the binary signal is inverted. At least one of high-level and low-level signals is output as an output signal based on the cumulative period of time. If the high-level (low-level) signal is output when the cumulative period of time of the high-level (low-level) state of the binary signal reaches a certain value, noise resulting from signal level switching from LOW to HIGH (HIGH to LOW) can be eliminated. Further, if the cumulative period of time is measured only for the predetermined period of time after the inversion of the polarity of the binary signal, noise resulting from phase inversion, for instance, can be eliminated. Thus, according to the present invention, the phase-modulated signal can be demodulated with accuracy by eliminating noise components from the binary signal.

BRIEF DESCRIPTION OF THE DRAWINGS

Other objects, features and advantages of the present invention will become more apparent from the following detailed description when read in conjunction with the accompanying drawings, in which:

FIG. 11 is a timing chart of signals for illustrating a method of obtaining a digital demodulated signal from a PSK-modulated signal in the wobble signal processing circuit of FIG. 7.

DETAILED DESCRIPTION OF THE PREFERRED EMBODIMENTS

A description will now be given, with reference to the accompany drawings, of an embodiment of the present invention.

Figure 1:
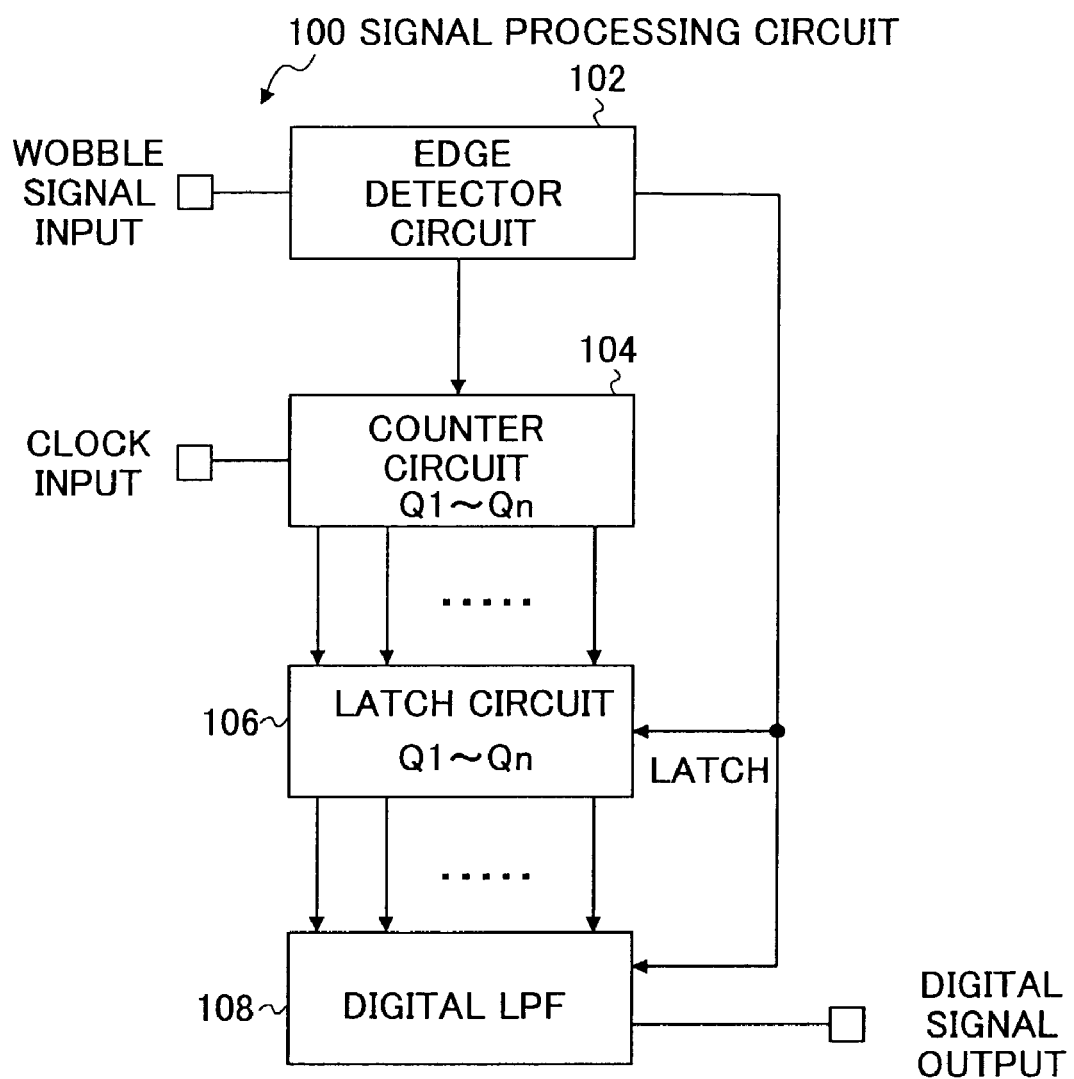
FIG. 1 is a block diagram showing a conventional signal processing circuit for converting a sinusoidal wobble signal to a digital signal.
Figure 2:
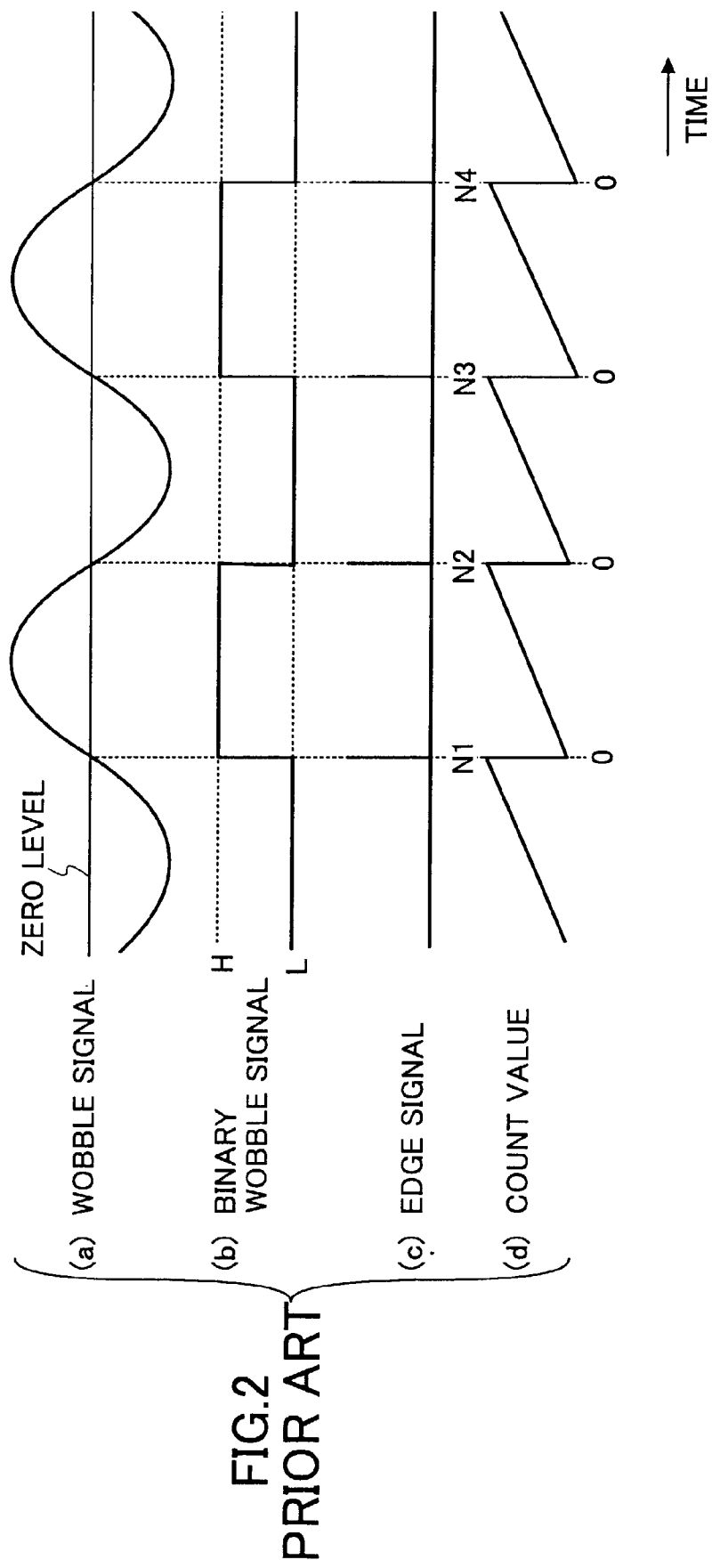
FIG. 2 is a timing chart of signals in the signal processing circuit of FIG. 1.
Figure 3:
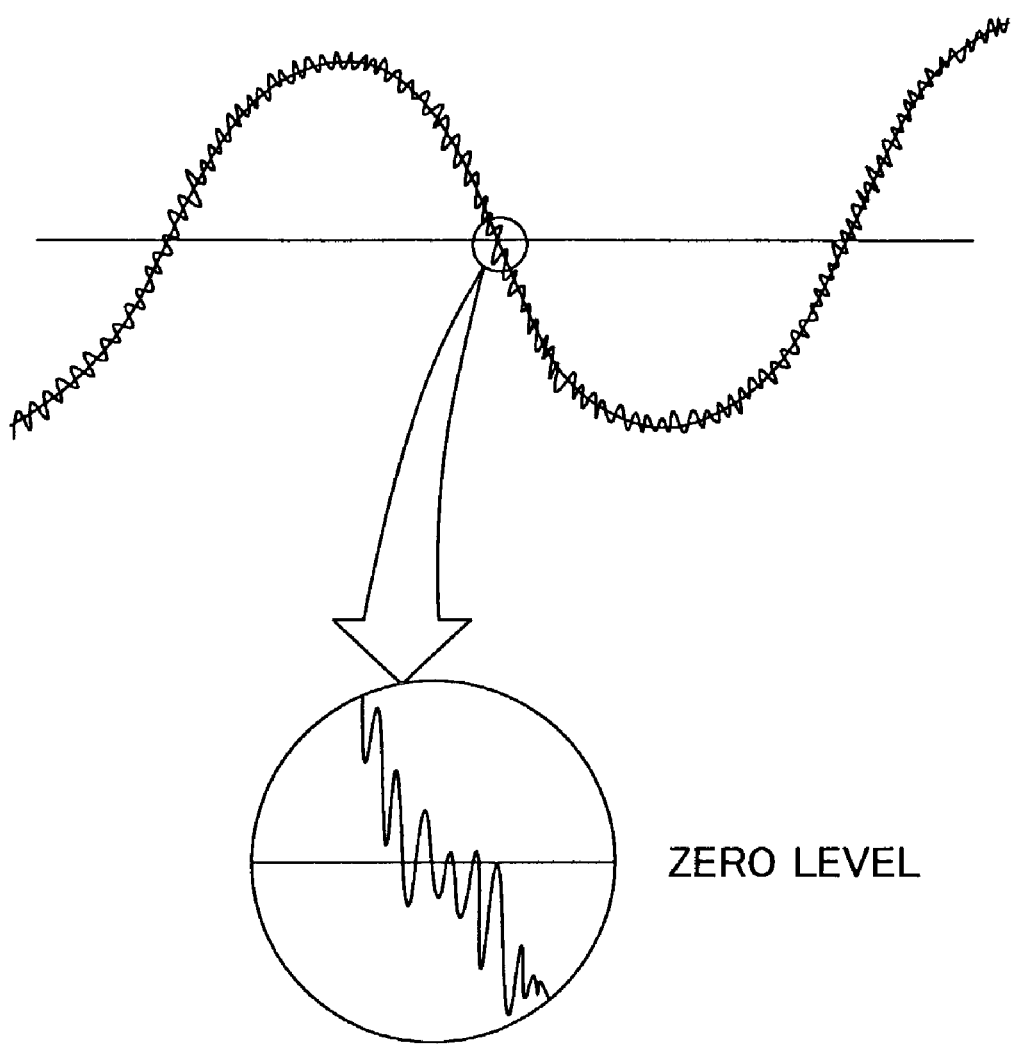
FIG. 3 is a diagram showing a variation over time of the sinusoidal wobble signal resulting from a wobble formed on a disk, the sinusoidal wobble signal being extracted in an optical disk unit.
Figure 4:
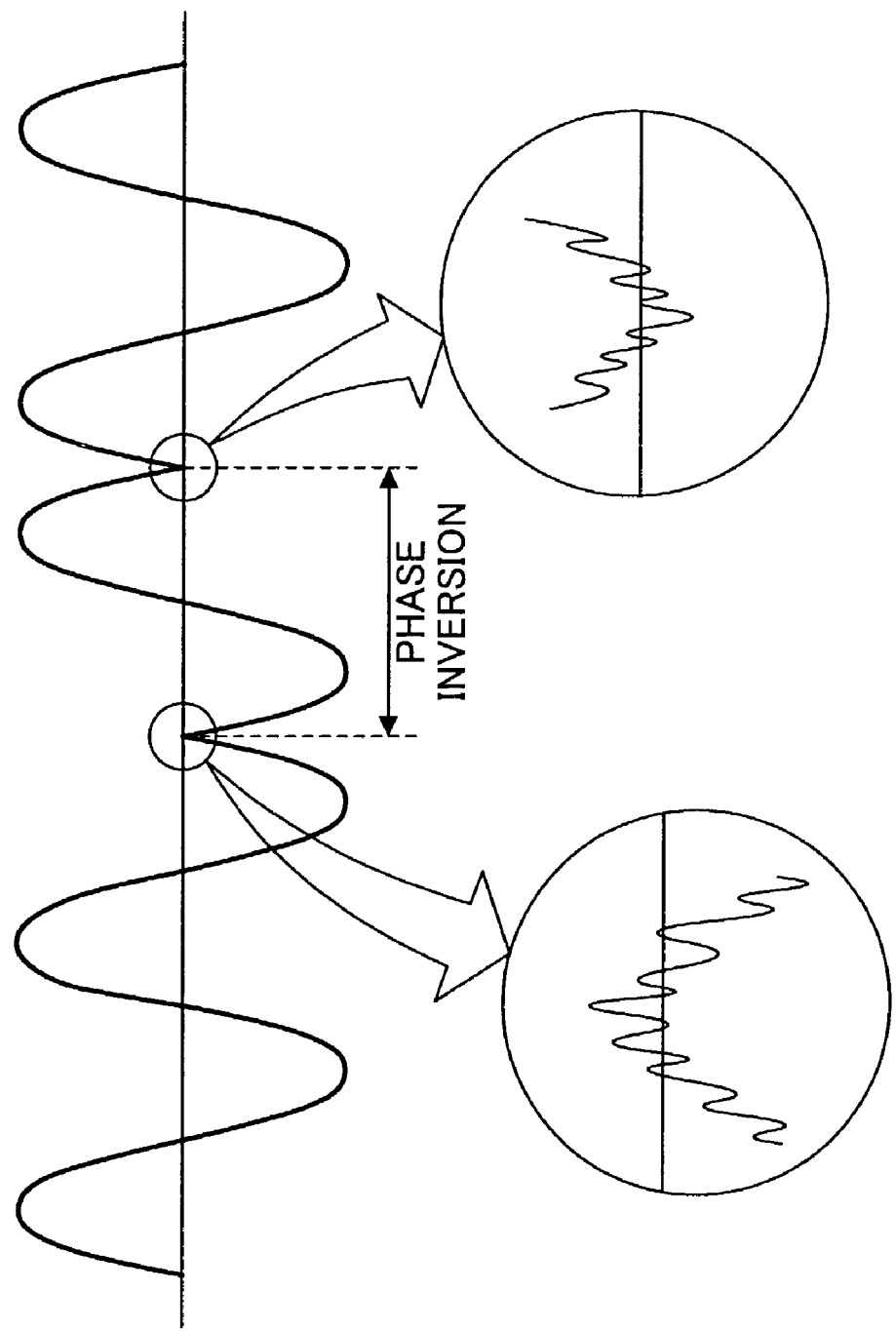
FIG. 4 is a diagram showing a variation over time of the wobble signal extracted in the optical disk unit when the wobble formed on the disk is PSK-modulated in accordance with the address information of the disk.
Figure 5:
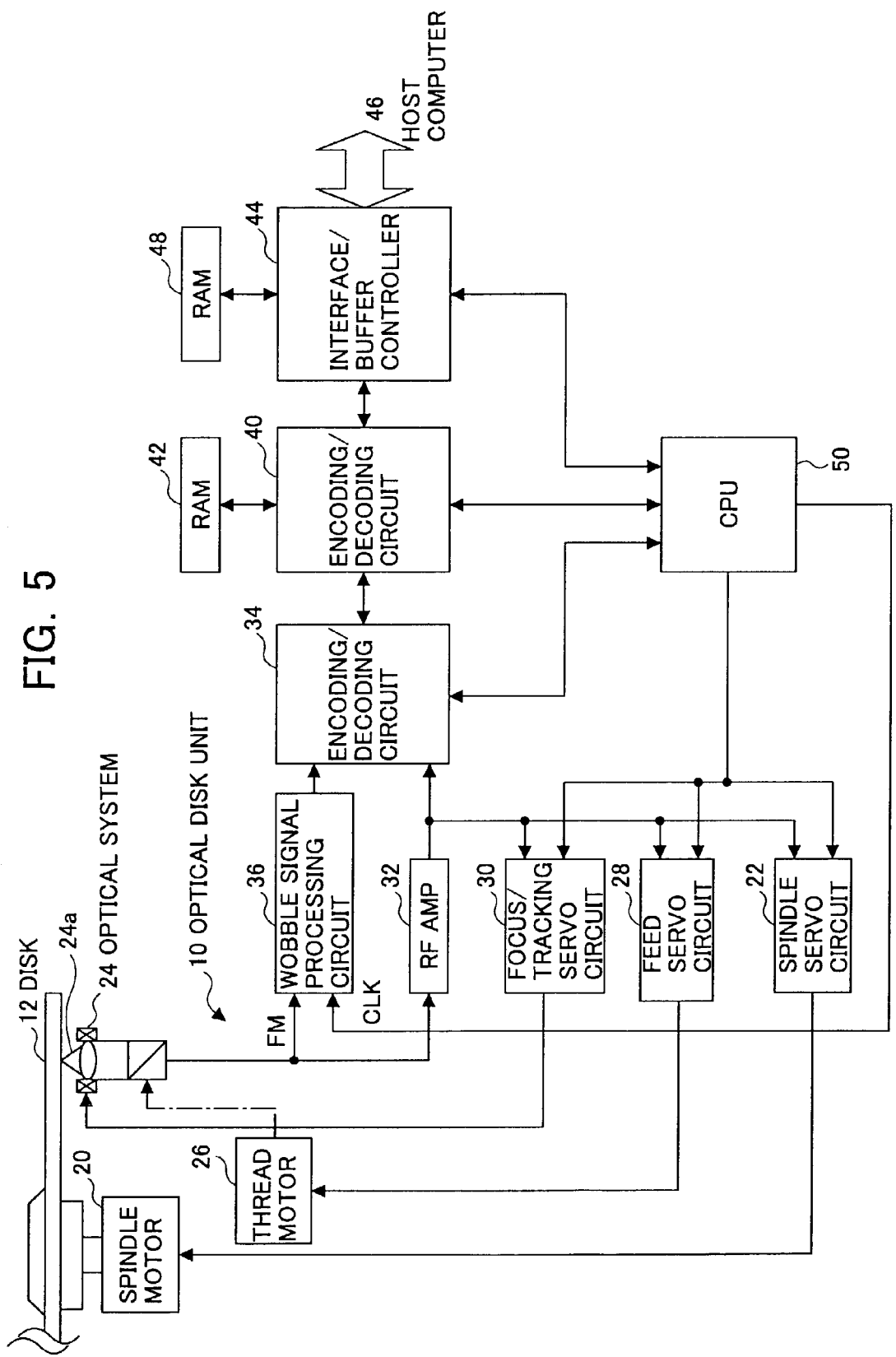
FIG. 5 is a block diagram showing an optical disk unit including a signal processing circuit and a demodulator circuit according to an embodiment of the present invention.
Figure 6:
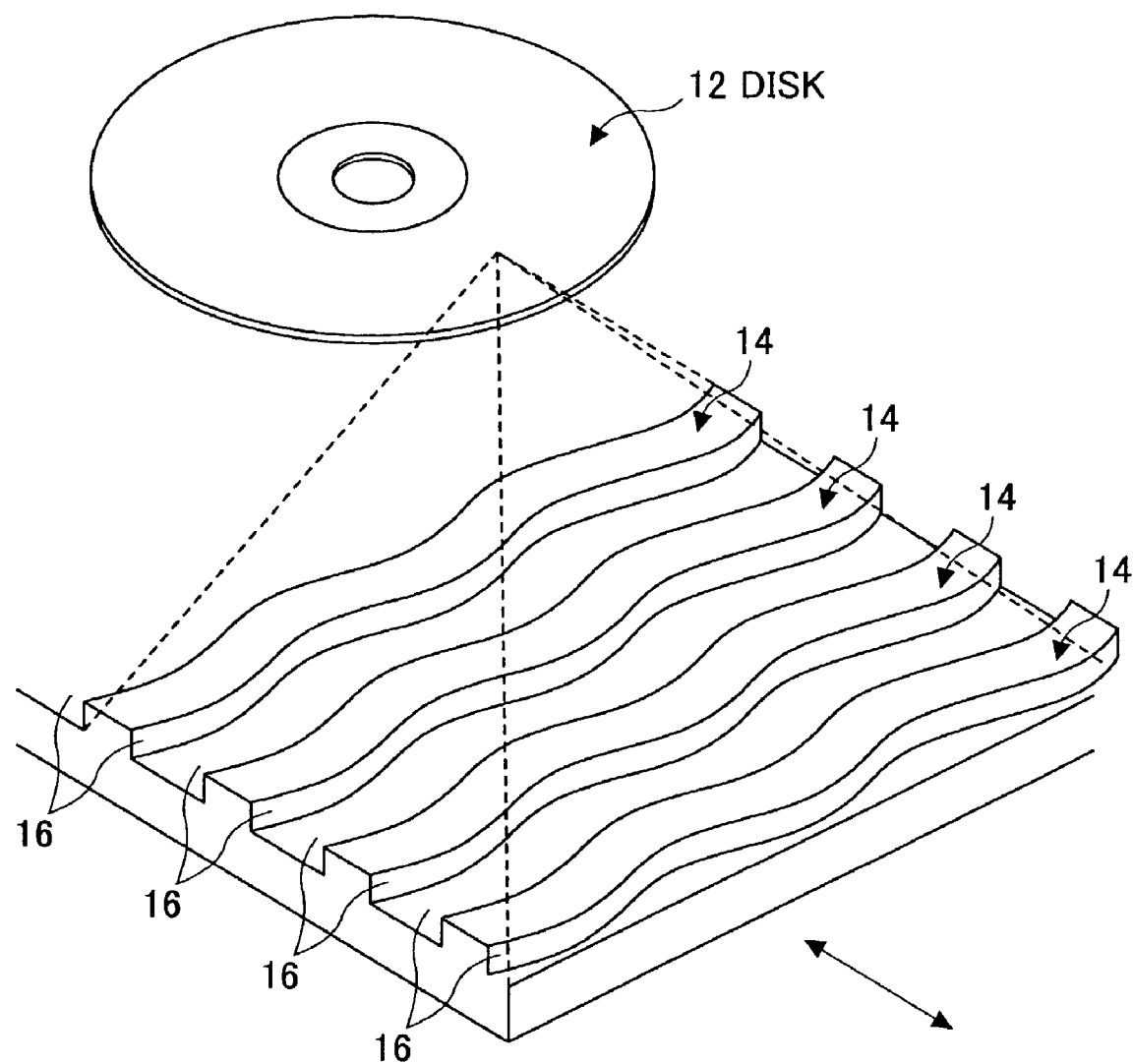
FIG. 6 is a diagram showing the configuration of an optical disk attached to the optical disk unit of FIG. 5.

FIG. 5 is a block diagram showing an optical disk unit 10 including a signal processing circuit and a demodulator circuit according to the embodiment of the present invention. FIG. 6 is a diagram showing the configuration of an optical disk 12 attached to the optical disk unit 10 of this embodiment.

In this embodiment, the optical disk unit 10 is a DVD+R or DVD+RW drive, for instance, and records information on and reproduces information from the optical disk (hereinafter simply referred to as a disk) 12, which is a DVD+R or DVD+RW disk, for instance, when the disk 12 is attached to the optical disk unit 10. The disk 12 attached to the optical disk unit 10 includes grooves 14 as tracks for information recording and reproduction as shown in FIG. 6. The grooves 14 meander at a given frequency in the radial directions of the disk 12. That is, a sinusoid-like (hereinafter, sinusoidal) wobble 16 is formed on the disk 12. The sinusoidal wobble 16 includes parts at which its phase is inverted based on absolute address information indicating positions on the tracks of the disk 12.

As shown in FIG. 5, the optical disk unit 10 includes a spindle motor 20. The spindle motor 20 has the function of rotating the disk 12 attached to the optical disk unit 10. The spindle motor 20 is connected to a spindle servo circuit 22. The spindle servo circuit 22 instructs the spindle motor 20 to rotate the disk 12 at a given rotational speed.

Further, the optical disk unit 10 includes an optical system 24. The optical system 24 includes an optical head 24a, which is provided so as to oppose the surface of the disk 12 attached to the optical disk unit 10. The optical head 24a records information on the disk 12 by emitting a laser light thereonto, and outputs a reproduction signal corresponding to information recorded on the disk 12 by receiving a reflected light therefrom.

The optical disk unit 10 further includes a thread motor 26. The thread motor 26 has the function of moving a carriage forming the optical system 24 in the radial directions of the disk 12. The thread motor 26 is connected to a feed servo circuit 28. The feed servo circuit 28 instructs the thread motor 26 to drive the carriage of the optical system 24 so that the carriage is located at a given position in the radial directions of the disk 12.

The optical system 24 includes a focus and tracking actuator (not shown in the drawing) that performs focus and tracking control of the optical system 24. The focus and tracking actuator is connected to a focus and tracking servo circuit 30. The servo circuit 30 instructs the actuator to drive the optical system 24 so that the optical system 24 performs focus and tracking operations in compliance with given rules. The thread motor 26 and the focus and tracking actuator are thus driven so that the position of the laser beam emitted from the optical system 24 onto the disk 12 is controlled.

The optical system 24 is connected to an RF amplifier 32. The reproduction signal corresponding to the information recorded on the disk 12 is output from the optical head 24a to be supplied to the RF amplifier 32. The RF amplifier 32 amplifies the reproduction signal. The RF amplifier 32 is connected to an encoding and decoding circuit 34. The main signal of the reproduced signal amplified in the RF amplifier 32 is supplied to the encoding and decoding circuit 34. The encoding and decoding circuit 34 extracts servo signals from the signal supplied from the RF amplifier 32, and supplies the extracted servo signals to the respective servo circuits 22, 28, and 30.

The optical system 24 is also connected to a wobble signal processing circuit 36. The reproduction signal output from the optical head 24a includes a sinusoidal signal resulting from the wobble 16 formed on the disk 12. Hereinafter, this signal is referred to as a wobble signal. Since the phase of the wobble 16 is invertible, the wobble signal supplied from the optical head 24a is PSK-modulated. The wobble signal processing circuit 36 extracts the sinusoidal wobble signal from the reproduction signal output from the optical head 24a, and processes the extracted wobble signal as described later in detail. The wobble signal processing circuit 36 is also connected to the encoding and decoding circuit 34. The encoding and decoding circuit 34 extracts the address information indicating positions on the tracks of the disk 12.

The encoding and decoding circuit 34 is connected to an encoding and decoding circuit 40. The encoding and decoding circuit 40 encodes and decodes the error-correcting code (ECC) characteristic of the disk 12 and detects a header. The encoding and decoding circuit 40 includes a RAM 42. The RAM 42 is used as a working storage when the encoding and decoding circuit 40 performs processing.

The encoding and decoding circuit 40 is connected to an interface and buffer controller 44. The interface and buffer controller 44 is connected to a host computer 46 so as to exchange data with the host computer 46 and control a data buffer. The interface and buffer controller 44 includes a RAM 48. The RAM 48 is used as a working storage for the interface and buffer controller 44.

The encoding and decoding circuits 34 and 40 and the interface and buffer controller 44 are connected to a CPU 50. The CPU 50 controls the entire optical disk unit 10 based on a command from the host computer 46. Specifically, the CPU 50 controls the above-described control operations of the spindle servo circuit 22, the feed servo circuit 28, and the focus and tracking servo circuit 30, and controls the laser of the optical system 24. In FIG. 5, a block representing the recording system of the optical disk unit 10 is omitted for convenience of description.

Figure 7:
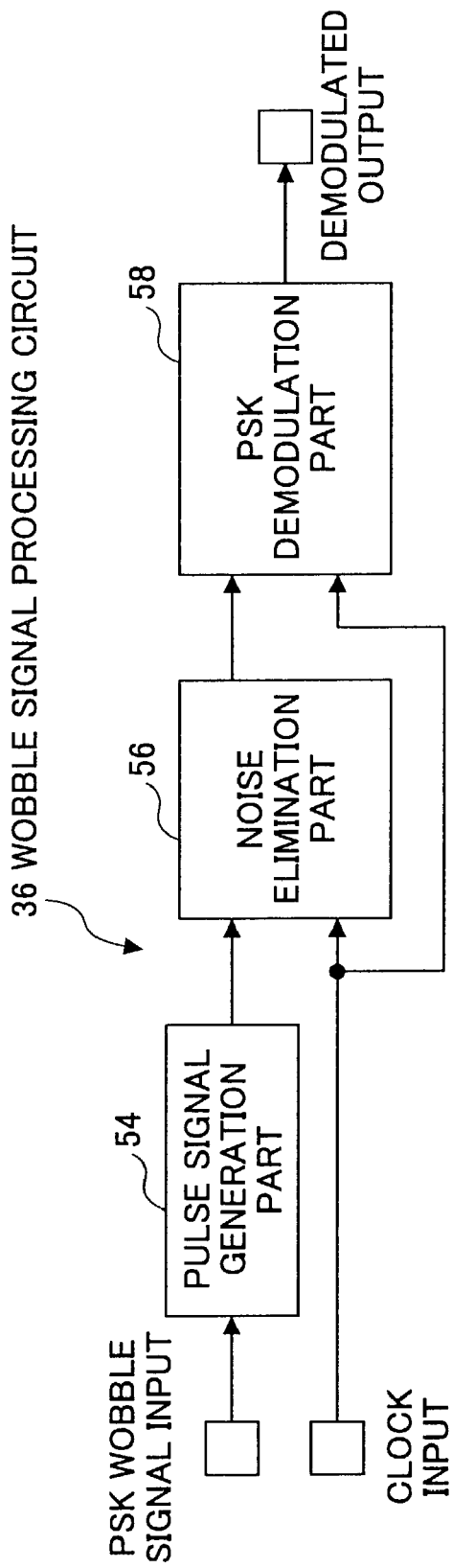
FIG. 7 is a block diagram showing a wobble signal processing circuit of the optical disk unit of FIG. 5.

FIG. 7 is a block diagram showing the wobble signal processing circuit 36 of the optical disk unit 10 of this embodiment. The wobble signal processing circuit 36 includes a pulse signal generation part 54. The reproduced wobble signal is supplied from the optical head 24a of the optical system 24 to the pulse signal generation part 54. The pulse signal generation part 54 first compares the sinusoidal PSK-modulated signal supplied as a wobble signal with a zero level. The pulse signal generation part 54 outputs a high-level signal if the level of the PSK-modulated signal is at or above "0", and outputs a low-level signal if the level of the PSK-modulated signal is below "0", thereby converting the wobble signal to binary digital data and generating a pulse signal, Hereinafter, the pulse signal is referred to as a binary wobble signal.

The output terminal of the pulse signal generation part 54 is connected to a noise elimination part 56. The binary wobble signal generated in the pulse signal generation part 54 is supplied to the noise elimination part 56. Reference clock pulses are supplied from the CPU 50 to the noise elimination part 56 at regular intervals. The noise elimination part 56 has the function of eliminating noise from the supplied binary wobble signal as described later. The output terminal of the noise elimination part 56 is connected to a PSK demodulation part 58. The reference clock pulses are supplied from the CPU 50 to the PSK demodulation part 58. The PSK demodulation part 58 demodulates the digital PSK-modulated signal supplied from the noise elimination part 56, and outputs the demodulated signal to the encoding and decoding circuit 34 as the output signal of the wobble signal processing circuit 36.

Figure 8:
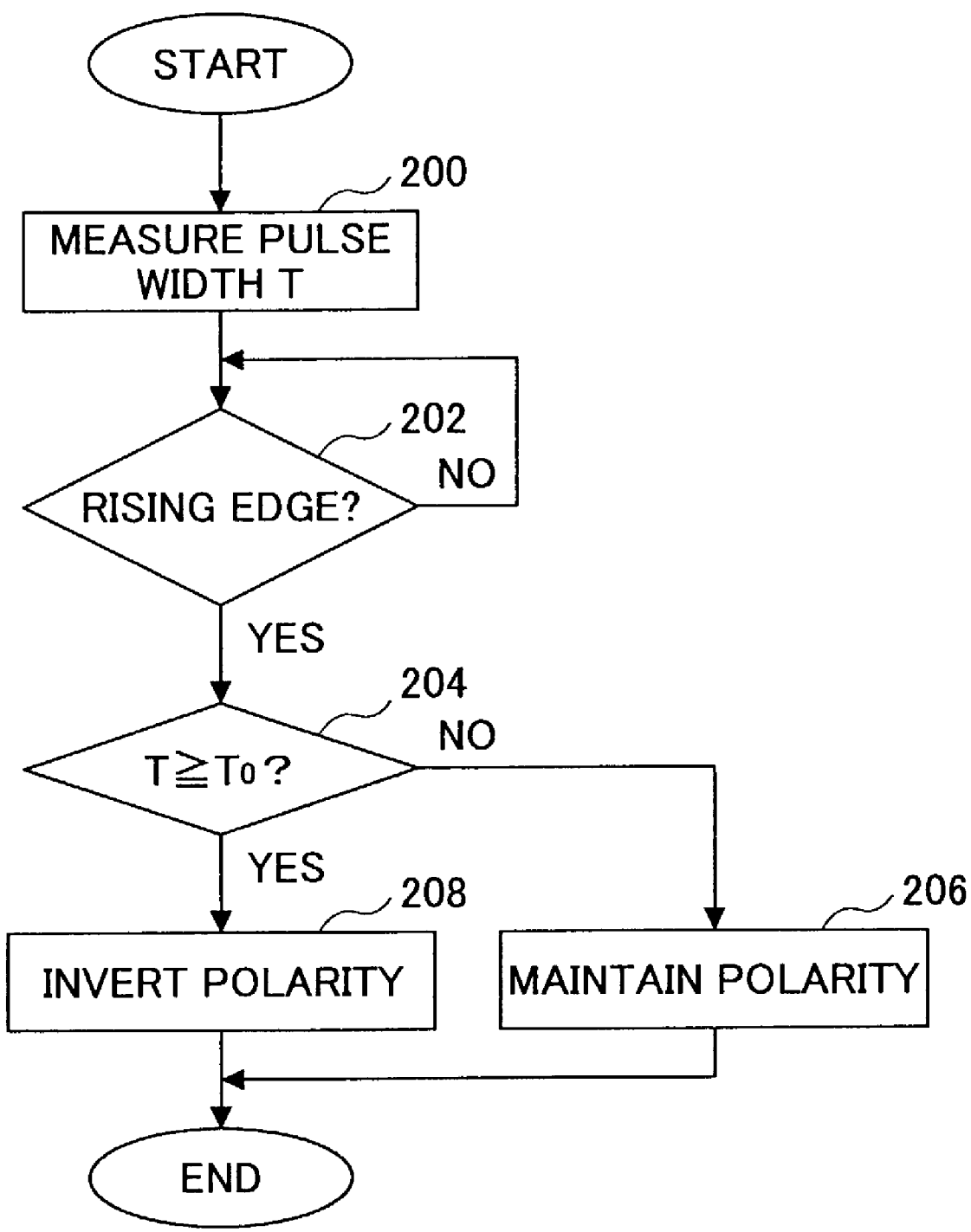
FIG. 8 is a flowchart of a control routine executed in a PSK demodulation part of the wobble signal processing circuit of FIG. 7.

FIG. 8 is a flowchart of a control routine executed in the PSK demodulation part 58 of the wobble signal processing circuit 36 of this embodiment. When the routine shown in FIG. 8 is started, first, the operation of step S200 is performed.

In step S200, a pulse width T of the binary wobble signal from which noise has been eliminated in the noise elimination part 56 (hereinafter referred to as a noiseless binary wobble signal) is measured with respect to each of the high-level (HIGH) and low-level (LOW) states of the noiseless binary wobble signal. In step S202, it is determined whether the noiseless binary wobble signal is switched from LOW to HIGH, that is, whether the noiseless binary wobble signal has a rising edge generated therein. Step S202 is repeated until an affirmative determination is made. When it is determined in step S202 that a rising edge is generated in the noiseless binary wobble signal, step S204 is performed next.

In step S204, it is determined whether the pulse width T of the noiseless binary wobble signal measured in step S200 is larger than or equal to a predetermined value $T_0$. Since the noiseless binary wobble signal is PSK-modulated, the noiseless binary wobble signal may include a pulse width longer than the normal pulse width $T_0$. Therefore, if a pulse width longer than the normal pulse width $T_0$ is generated, it is determined that phase inversion has occurred in the noiseless binary wobble signal, that is, in the PSK-modulated wobble signal.

The predetermined value $T_0$ is the smallest pulse width T by which it can be determined that phase inversion has occurred. The predetermined value $T_0$ is set to a value exceeding half of the cycle of the PSK-modulated wobble signal resulting from the wobble 16 formed on the disk 12. If $T \geq T_0$ is not satisfied, that is, if $T < T_0$, it is determined that no phase inversion has occurred, so that it is appropriate to maintain the polarity of the digital demodulated signal. Therefore, if it is determined that $T < T_0$, step S206 is performed next. On the other hand, if it is determined that $T \geq T_0$, it is determined that phase inversion has occurred. Therefore, it is appropriate to invert the polarity of the digital demodulated signal so that the digital demodulated signal is set to LOW if the digital demodulated signal is HIGH and to HIGH if the digital demodulated signal is LOW. Accordingly, if it is determined-that $T \geq T_0$, step S208 is performed next.

In step S206, the polarity of the digital demodulated signal is maintained. Specifically, the digital demodulated signal is maintained to HIGH if the digital demodulated signal is HIGH, and to LOW if the digital demodulated signal is LOW. In step S208, the polarity of the digital demodulated signal is inverted. Specifically, the digital demodulated signal is set to LOW if the digital demodulated signal is HIGH, and to HIGH if the digital demodulated signal is LOW. When step S206 or step S208 is terminated, this routine ends.

According to the routine shown in FIG. 8, the demodulated signal can be generated in accordance with the values of the pulse width T of the noiseless binary wobble signal. Specifically, if the pulse width T of the noiseless binary wobble signal is relatively short, a signal maintaining the previous polarity is output. If the pulse width T of the noiseless binary wobble signal is relatively long, a signal having the inverted polarity is output. Therefore, according to this embodiment, the PSK-modulated wobble signal can be demodulated appropriately into digital data, so that the absolute addresses indicating positions on the tracks of the disk 12 can be detected based on the demodulated signal.

Figure 9:
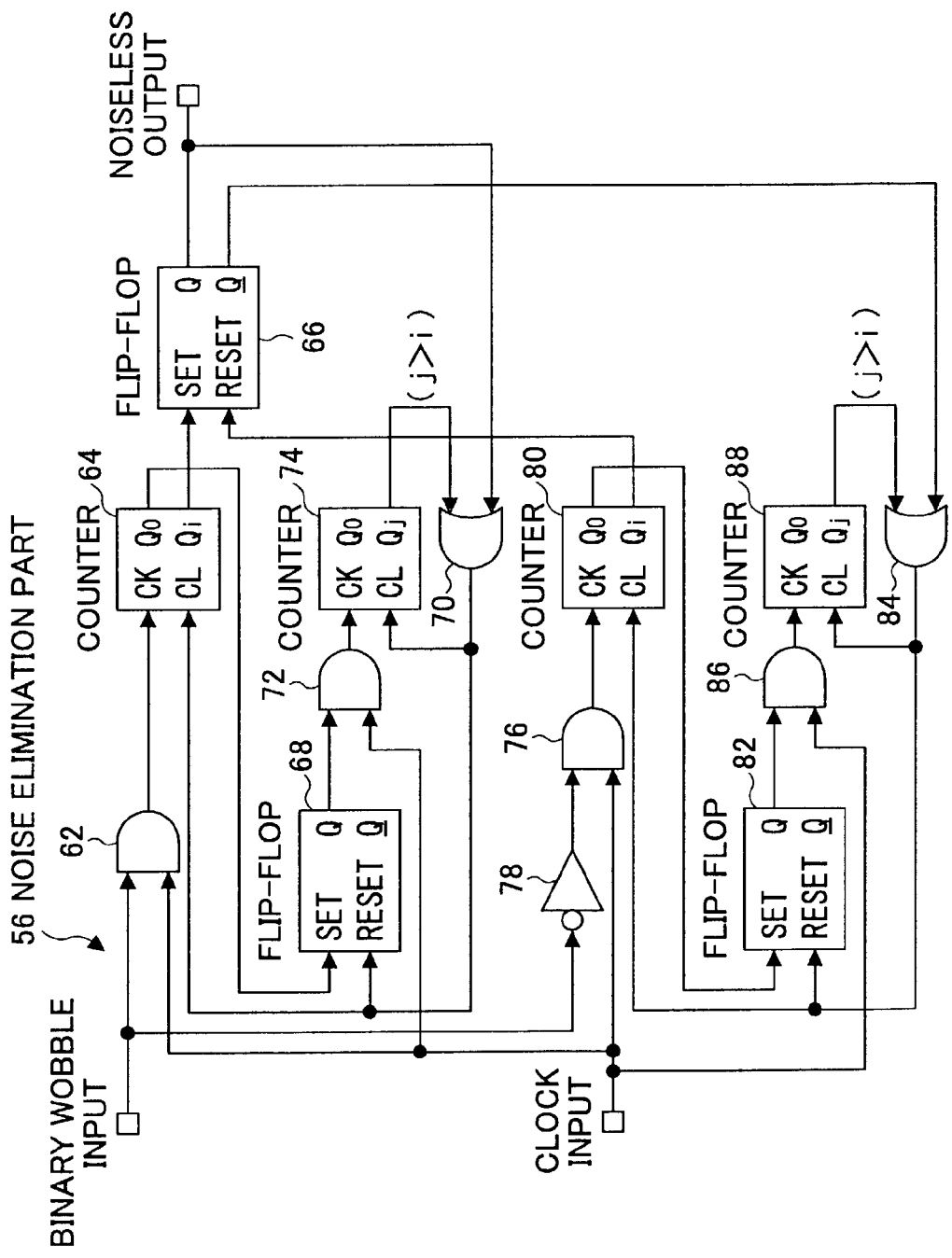
FIG. 9 is a block diagram showing a noise elimination part of the wobble signal processing circuit of FIG. 7.

FIG. 9 is a block diagram showing the noise elimination part 56 of the wobble signal processing circuit 36 of this embodiment. The noise elimination part 56 includes an AND gate 62. One input terminal of the AND gate 62 is connected to the output terminal of the pulse signal generation part 54, and the other input terminal of the AND gate 62 is connected to the terminal of the CPU 50 which terminal outputs the reference clock signal (pulses). The AND gate 62 passes the reference clock signal supplied from the CPU 50 in accordance with the binary wobble signal generated in the pulse signal generation part 54. Specifically, the AND gate 62 passes the reference clock signal when the binary wobble signal is set to HIGH.

The output terminal of the AND gate 62 is connected to the clock input terminal of a high gate counter 64. The reference clock signal passing the AND gate 62 is supplied to the high gate counter 64. The high gate counter 64 has the function of counting the number of pulses of the reference clock signal supplied from the AND gate 62. The output terminal $Q_i$ of the high gate counter 64 is connected to the set terminal of an RS flip-flop 66. The high gate counter 64 supplies the set terminal of the RS flip-flop 66 with the value $Q_i$ of the $i^{th}$ digit of a count value obtained by counting the number of pulses of the reference clock signal. Further, the output terminal $Q_0$ of the high gate counter 64 is connected to the set terminal of an RS flip-flop 68. The high gate counter 64 supplies the set terminal of the RS flip-flop 68 with the value $Q_0$ of the $0^{th}$ digit of the count value obtained by counting the number of pulses of the reference clock signal.

The non-inverted output terminal Q of the RS flip-flop 66 is connected to the PSK demodulation part 58 as the output terminal of the noise elimination part 56 and also to and an OR gate 70. The output terminal of the OR gate 70 is connected to the reset terminal of the RS flip-flop 68, and the clear terminal of the high gate counter 64. The non-inverted output Q of the RS flip-flop 68 is connected to an AND gate 72. The reference clock signal is supplied from the CPU 50 to the AND gate 72. The AND gate 72 passes the reference clock signal when the non-inverted output Q of the RS flip-flop 68 is set to HIGH.

The output terminal of the AND gate 72 is connected to the clock input terminal of a counter 74. The reference clock signal passing the AND gate 72 is supplied to the counter 74. The counter 74 has the function of counting the number of pulses of the reference clock signal passing the AND gate 72. The output terminal $Q_j$ (j>i) is connected to the OR gate 70. The counter 74 supplies the OR gate 70 with the value $Q_j$ of the $j^{th}$ digit of a count value obtained by counting the number of pulses of the reference clock signal. Accordingly, the OR gate 70 outputs a high-level signal when either the non-inverted output Q of the RS flip-flop 66 or the value $Q_j$ of the $j^{th}$ digit of the count value of the counter 74 is set to HIGH. On the other hand, the OR gate 70 outputs a low-level signal when both the non-inverted output Q of the RS flip-flop 66 and the value $Q_j$ of the $j^{th}$ digit of the count value of the counter 74 are set to LOW. The output terminal of the OR gate 70 is also connected to the clear terminal of the counter 74.

That is, the RS flip-flop 68 is set, or the non-inverted output Q thereof is switched to HIGH, when the value $Q_0$ of the $0^{th}$ digit of the count value of the high gate counter 64 rises, or is switched to HIGH. When the non-inverted output Q of the RS flip-flop 66 or the value $Q_j$ of the $j^{th}$ digit of the count value of the counter 74 rises, the RS flip-flop 68 is reset, or the non-inverted output Q thereof is switched to LOW. Further, both the high gate counter 64 and the counter 74 are cleared when the non-inverted output Q of the RS flip-flop 66 or the value $Q_j$ of the $j^{th}$ digit of the count value of the counter 74 is set to HIGH.

The noise elimination part 56 further includes an AND gate 76. One input terminal of the AND gate 76 is connected to the output terminal of the pulse signal generation part 54 via an inverter circuit 78. The other input terminal of the AND gate 76 is connected to the terminal of the CPU 50 which terminal outputs the reference clock signal. The inverter circuit 78 inverts the binary wobble signal obtained as a result of binarizing the PSK-modulated wobble signal into a pulse signal in the pulse signal generation part 54, and supplies the inverted signal to the AND gate 76. The AND gate 76 passes the reference clock signal supplied from the CPU 50 in accordance with the inverted signal supplied from the inverter circuit 78. Specifically, the AND gate 76 passes the reference clock signal when the inverted signal is set to HIGH, that is, when the binary wobble signal generated in the pulse signal generation circuit 54 is set to LOW.

The output terminal of the AND gate 76 is connected to the clock input terminal of a low gate counter 80. The reference clock signal passing the AND gate 76 is supplied to the low gate counter 80. The low gate counter 80 has the function of counting the number of pulses of the reference clock signal supplied from the AND gate 76. The output terminal $Q_i$ of the low gate counter 80 is connected to the reset terminal of the RS flip-flop 66. The low gate counter 80 supplies the reset terminal of the RS flip-flop 66 with the value $Q_i$ of the $i^{th}$ digit of a count value obtained by counting the number of pulses of the reference clock signal.

That is, the RS flip-flop 66 is set, or the non-inverted output Q thereof is switched to HIGH and the inverted output /Q thereof is switched to LOW, when the value $Q_i$ of the $i^{th}$ digit of the count value of the high gate counter 64 rises. When the value $Q_i$ of the $i^{th}$ digit of the count value of the low gate counter 80 rises, the RS flip-flop 66 is reset, or the non-inverted output Q thereof is switched to LOW and the inverted output /Q thereof is switched to HIGH.

The output terminal $Q_0$ of the low gate counter 80 is connected to the set terminal of an RS flip-flop 82. The low gate counter 80 supplies the set terminal of the RS flip-flop 82 with the value $Q_0$ of the $0^{th}$ digit of the count value obtained by counting the number of pulses of the reference clock signal.

The inverted output terminal /Q of the RS flip-flop 66 is connected to an OR gate 84. The output terminal of the OR gate 84 is connected to the reset terminal of the RS flip-flop 82 and the clear terminal of the low gate counter 80. The non-inverted output Q of the RS flip-flop 82 is connected to an AND gate 86. The reference clock signal is supplied from the CPU 50 to the AND gate 86. The AND gate 86 passes the reference clock signal when the non-inverted output Q of the RS flip-flop 82 is set to HIGH.

The output terminal of the AND gate 86 is connected to the clock input terminal of a counter 88. The reference clock signal passing the AND gate 86 is supplied to the counter 88. The counter 88 has the function of counting the number of pulses of the reference clock signal passing the AND gate 86. The output terminal $Q_j$ (j>i) of the counter 88 is connected to the OR gate 84. The counter 88 supplies the OR gate 84 with the value $Q_j$ of the $j^{th}$ digit of the count value obtained by counting the number of pulses of the reference clock signal. Accordingly, the OR gate 84 outputs a high-level signal when either the inverted output /Q of the RS flip-flop 66 or the value $Q_j$ of the $j^{th}$ digit of the count value of the counter 88 is set to HIGH. On the other hand, the OR gate 84 outputs a low-level signal when both the inverted output /Q of the RS flip-flop 66 and the value $Q_j$ of the $j^{th}$ digit of the count value of the counter 88 are set to LOW. The output terminal of the OR gate 84, is also connected to the clear terminal of the counter 88.

That is, the RS flip-flop 82 is set, or the non-inverted output Q thereof is switched to HIGH, when the value $Q_0$ of the $0^{th}$ digit of the count value of the low gate counter 80 rises. The RS flip-flop 82 is reset, or the non-inverted output Q thereof is switched to LOW, when the inverted output /Q of the RS flip-flop 66 or the value $Q_j$ of the $j^{th}$ digit of the count value of the counter 88 rises. Both the low gate counter 80 and the counter 88 are cleared when either the inverted output /Q of the RS flip-flop 66 or the value $Q_j$ of the $j^{th}$ digit of the count value of the counter 88 is set to HIGH.

Next, a description will be given, with reference to FIG. 10, of an operation of the noise elimination part 56 shown in FIG. 9.

Figure 10:
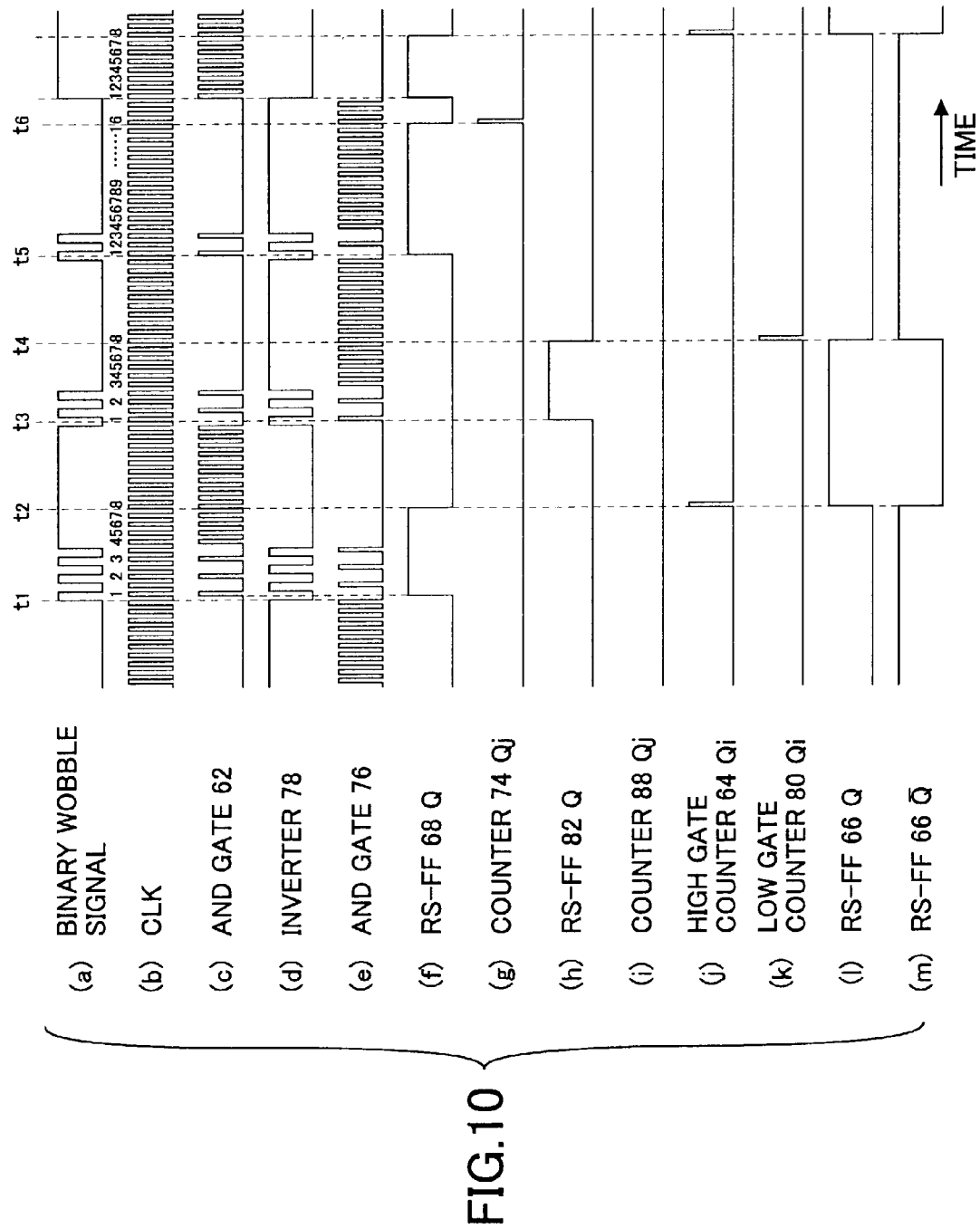
FIG. 10 is a timing chart of signals in the noise elimination part of FIG. 9.

FIG. 10 is a timing chart of signals in the noise elimination part 56 shown in FIG. 9. In FIG. 10, (a) indicates the output waveform of the pulse signal generation part 54, (b) indicates the reference clock signal, (c) indicates the output waveform of the AND gate 62, (d) indicates the output waveform of the inverter circuit 78, (e) indicates the output waveform of the AND gate 76, (f) indicates the waveform of the non-inverted output Q of the RS flip-flop 68, (g) indicates the waveform of the output $Q_j$ of the counter 74, (h) indicates the waveform of the non-inverted output Q of the RS flip-flop 82, (i) indicates the waveform of the output $Q_j$ of the counter 88, (j) indicates the waveform of the output $Q_i$ of the high gate counter 64, (k) indicates the waveform of the output $Q_i$ of the low gate counter 80, (l) indicates the waveform of the non-inverted output Q of the RS flip-flop 66, and (m) indicates the waveform of the inverted output /Q of the RS flip-flop 66.

Under the condition where the binary wobble pulse signal generated in the pulse signal generation part 54 is maintained to LOW before a time $t_1$ in FIG. 10, the non-inverted output Q and the inverted output /Q of the RS flip-flop 66 are maintained to LOW and HIGH, respectively. In this case, the clear state of each of the high gate counter 64 and the counter 74 is canceled, the reset state of the RS flip-flop 68 is canceled, the low gate counter 80 and the counter 88 are cleared, and the RS flip-flop 82 is reset.

When the binary wobble pulse signal is switched to HIGH from the above-described state at the time $t_1$ as indicated by (a) of FIG. 10, the AND gate 62 passes the reference clock signal only while the binary wobble pulse signal is set to HIGH as indicated by (c) of FIG. 10, thereby causing the high gate counter 64 to start to count the number of pulses of the reference clock signal. When the binary wobble pulse signal is switched from HIGH to LOW, the AND gate 62 stops passing the reference clock signal, so that the high gate counter 64 suspends counting of the number of pulses of the reference clock signal.

When the high gate counter 64 starts to count the number of pulses of the reference clock signal, the output $Q_0$ of the high gate counter 64 is switched to HIGH at the first clock pulse. When the output $Q_0$ of the high gate counter 64 is switched to HIGH, the high-level signal is supplied to the set terminal of the RS flip-flop 68, so that the non-inverted output Q of the RS flip-flop 68 is switched to HIGH as indicated by (f) of FIG. 10. When the non-inverted output Q of the RS flip-flop 68 is switched to HIGH, the AND gate 72 passes the reference clock signal, thereby causing the counter 74 to count the number of pulses of the reference clock signal.

If the counter 74 is designed to supply the value $Q_4$ of the fourth digit (j=4) of its count value to the OR gate 70, the counter 74 supplies a low-level signal to the OR gate 70 until the counter 74 counts 16 reference clock pulses. Half of the cycle of the wobble signal is set to be longer than a period during which the counter 74 counts 16 reference clock pulses. Further, if the high gate counter 64 is designed to supply the value $Q_3$ (i=3<j) of the third digit of its count value to the set terminal of the RS flip-flop 66, the high gate counter 64 supplies a low-level signal to the set terminal of the RS flip-flop 66 until the high gate counter 64 counts eight reference clock signals.

When the high gate counter 64 counts eight reference clock pulses at a time $t_2$ in FIG. 10 before the counter 74 counts 16 reference clock pulses, the output $Q_3$ of the high gate counter 64 is switched to HIGH, so that the high gate counter 64 supplies the high-level signal to the set terminal of the RS flip-flop 66 as indicated by (j) of FIG. 10. When the high-level signal is supplied to the set terminal of the RS flip-flop 66, the non-inverted output Q of the RS flip-flop 66 is switched to HIGH as indicated by (l) of FIG. 10, while the inverted output /Q of the RS flip-flop 66 is switched to LOW as indicated by (m) of FIG. 10.

When the non-inverted output Q of the RS flip-flop 66 is switched to HIGH, both the high gate counter 64 and the counter 74 are cleared, and the RS flip-flop 68 is reset. When the inverted output /Q of the RS flip-flop 66 is switched to LOW, the clear state of each of the low-level counter 80 and the counter 88 is canceled and the reset state of the RS flip-flop 82 is also canceled.

Thereafter, when the binary wobble pulse signal supplied from the pulse signal generation part 54 is switched from HIGH to LOW, the AND gate 76 passes the reference clock signal only while the binary wobble pulse signal is set to LOW as indicated by (e) of FIG. 10, thereby causing the low gate counter 80 to start to count the number of pulses of the reference clock signal. When the binary wobble pulse signal is switched from LOW to HIGH, the AND gate 76 stops passing the reference clock signal, so that the low gate counter 80 suspends counting of the number of pulses of the reference clock signal.

When the low gate counter 80 starts to count the number of pulses of the reference clock signal, the output $Q_0$ of the low gate counter 80 is switched to, HIGH at the first clock pulse at a time $t_3$ in FIG. 10. When the output $Q_0$ of the low gate counter 80 is switched to HIGH, the high-level signal is supplied to the set terminal of the RS flip-flop 82, so that the non-inverted output Q of the RS flip-flop 82 is switched to HIGH as indicated by (h) of FIG. 10. When the non-inverted output Q of the RS flip-flop 82 is switched to HIGH, the AND gate 86 passes the reference clock signal, thereby causing the counter 88 to start to count the number of pulses of the reference clock signal.

If, like the counter 74, the counter 88 is designed to supply the value $Q_4$ (j=4) of the fourth digit of its count value to the OR gate 84, the counter 88 supplies a low-level signal to the OR gate 84 until the counter 88 counts 16 reference clock pulses. Half of the cycle of the wobble signal is set to be longer than a period during which the counter 88 counts 16 reference clock pulses. Further, if, like the high gate counter 64, the low gate counter 80 supplies the value $Q_3$ (i=3<j) of the third digit of its count value to the reset terminal of the RS flip-flop 66, the low gate counter 80 supplies a low-level signal to the reset terminal of the RS flip-flop 66 until the low gate counter 80 counts eight reference clock pulses.

When the low gate counter 88 counts eight reference clock pulses at a time $t_4$ in FIG. 10 before the counter 88 counts 16 reference clock pulses, the output $Q_3$ of the low gate counter 80 is switched to HIGH, so that the low gate counter 80 supplies the high-level signal to the reset terminal of the RS flip-flop 66 as indicated by (k) of FIG. 10. When the high-level signal is supplied to the reset terminal of the RS flip-flop 66, the non-inverted output Q of the RS flip-flop 66 is switched to LOW as indicated by (l) of FIG. 10 while the inverted output /Q of the RS flip-flop 66 is switched to HIGH as indicated by (m) of FIG. 10.

When the non-inverted output Q of the RS flip-flop 66 is switched to LOW, the clear state of each of the high gate counter 64 and the counter 74 is canceled, and the reset state of the RS flip-flop 68 is also canceled. Further, when the inverted output /Q of the RS flip-flop 66 is switched to HIGH, both the low gate counter 80 and the counter 88 are cleared, and the RS flip-flop 82 is reset.

Next, when the binary wobble signal is switched to HIGH at a time $t_5$, the AND gate 62 passes the reference clock signal only while the binary wobble signal is set to HIGH, thereby causing the high gate counter 64 to start to count the number of pulses of the reference clock signal. The non-inverted output Q of the RS flip-flop 68 is switched to HIGH at the first clock pulse, and the AND gate 72 passes the reference clock signal only while the non-inverted output Q of the RS flip-flop 68 is set to HIGH, thereby causing the counter 74 to start to count the number of pulses of the reference clock signal.

After starting to count of the number of pulses of the reference clock signal, the high gate counter 64 suspends the counting while the binary wobble signal is set to LOW. On the other hand, the counter 74 never suspends or stops counting of the number of pulses of the reference clock signal after starting the counting unless the output of the OR gate 70 is switched to HIGH (that is, unless the non-inverted output Q of the RS flip-flop 66 is switched to HIGH or the output $Q_4$ of the counter 74 is switched to HIGH by the counter 74 counting 16 reference clock pulses). Accordingly, even if the high gate counter 64 and the counter 74 start to count the number of pulses of the reference clock signal at the same time, the output $Q_4$ of the counter 74 may be switched to HIGH earlier than the output $Q_3$ of the high gate counter 64.

When the counter 74 counts 16 reference clock pulses at a time $t_6$ in FIG. 10 before the high gate counter 64 counts eight reference clock pulses, the output $Q_4$ of the counter 74 is switched to HIGH, so that the counter 74 supplies the high-level signal to the OR gate 70 as indicated by (g) of FIG. 10. In this case, even if the non-inverted output Q of the RS flip-flop 66 is not switched to HIGH, both the high gate counter 64 and the counter 74 are cleared and the RS flip-flop 68 is reset by the output of the OR gate 70 being switched to HIGH. Further, when the counter 74 is cleared, the output $Q_4$ of the counter 74 is switched to LOW, so that the signal supplied to the OR gate 70 is switched to LOW. Accordingly, immediately after the high gate counter 64 and the counter 74 are cleared and the RS flip-flop 68 is reset by the high-level output of the counter 74, these clear and reset states are canceled.

Likewise, after starting to count the number of pulses of the reference clock signal, the low gate counter 80 suspends the counting while the binary wobble signal is set to HIGH, while the counter 88 never suspends or stops counting of the number of pulses of the reference clock signal after starting the counting unless the output of the OR gate 84 is switched to HIGH (that is, unless the inverted output /Q of the RS flip-flop 66 is switched to HIGH or the output $Q_4$ of the counter 88 is switched to HIGH by the counter 88 counting 16 reference clock pulses). Accordingly, even if the low gate counter 80 and the counter 88 starts to count the number of pulses of the reference clock signal at the same time, the output $Q_4$ of the counter 88 may be switched to HIGH earlier than the output $Q_3$ of the low gate counter 80.

When the counter 88 counts 16 reference clock pulses before the low gate counter 80 counts eight clock pulses, the output $Q_4$ of the counter 88 is switched to HIGH, so that the counter 88 supplies the high-level signal to the OR gate 84. In this case, even if the inverted output /Q of the RS flip-flop 66 is not switched to HIGH, both the low gate counter 80 and the counter 88 are cleared and the RS flip-flop 82 is reset by the output of the OR gate 84 being switched to HIGH. Further, when the counter 88 is cleared, the output $Q_4$ of the counter 88 is switched to LOW, so that the signal supplied to the OR gate 84 is switched to LOW. Accordingly, immediately after the low gate counter 80 and the counter 88 are cleared and the RS flip-flop 82 is reset by the high-level output of the counter 88, these clear and reset states are canceled.

In the above-described configuration, the high gate counter 64 counts the number of pulses of the reference clock signal only when the binary wobble signal obtained as a result of converting the wobble signal to a pulse signal is set to HIGH. It is determined that the PSK-modulated wobble signal becomes HIGH (or goes above the zero level) when the counted number of pulses reaches a predetermined value as a result of the counting. Further, the low gate counter 80 counts the number of pulses of the reference clock signal only when the binary wobble signal is set to LOW. It is determined that the PSK-modulated wobble signal becomes LOW (or goes below the zero level) when the counted number of pulses reaches the predetermined value as a result of counting.

That is, the number of pulses of the reference clock signal for determining whether the PSK-modulated wobble signal becomes HIGH does not increment when the binary wobble signal is set to LOW, but increments only when the binary wobble signal is set to HIGH. On the other hand, the number of pulses of the reference clock signal for determining whether the PSK-modulated wobble signal becomes LOW does not increment when the binary wobble signal is set to HIGH, but increments only when the binary wobble signal is set to LOW. When the cumulative number of pulses of the reference clock signal reaches the predetermined value, that is, when the cumulative period of time of the HIGH (high-level) or LOW (low-level) state of the binary wobble signal reaches a predetermined period of time, the HIGH or LOW state of the binary wobble signal, that is, the HIGH or LOW state of the PSK-modulated wobble signal, is determined.

Accordingly, in this embodiment, even if the binary wobble signal obtained as a result of converting the wobble signal to a binary pulse signal in the pulse signal generation part 54 includes noise components, the inversion of the polarity of the binary wobble signal is prevented from being determined by the first noise. Further, counting the number of pulses of the reference clock signal, triggered off by the first noise, is prevented from being continued regardless of the state of the binary wobble signal. Therefore, noise can be successfully eliminated from the binary wobble signal generated in the pulse signal generation part 54. As a result, detection of the high-level and low-level periods of the binary wobble signal can be performed with the effect of noise being reduced.

As previously described, since the phase of the wobble 16 formed on the disk 12 is invertible, the wobble signal supplied from the optical head 24a is PSK-modulated. Further, noise is superimposed on the wobble signal. Therefore, at the time of phase inversion, the PSK-modulated wobble signal may go above the zero level even though the wobble signal should be maintained at or below the zero level or may go below the zero level even though the wobble signal should be maintained at or above the zero level. As a result, in some cases, noise is superimposed on the binary wobble signal supplied from the pulse signal generation part 54.

If it is triggered by noise generated at the time of the phase inversion of the PSK-modulated wobble signal to start counting the number of pulses of the reference clock signal for determining whether the PSK-modulated wobble signal becomes HIGH or LOW, the detected high-level or low-level period of the binary wobble signal is affected by the noise, so that such detection is prevented from being performed with accuracy. Accordingly, it should also be ensured that noise generated by phase inversion is eliminated.

After noise has been generated by the phase inversion, the PSK-modulated wobble signal is maintained below or above the zero level for a period of approximately half of its cycle. In this embodiment, as previously described, it is determined that the PSK-modulated wobble signal becomes HIGH or LOW when the cumulative period of time of the HIGH or LOW state of the binary wobble signal reaches the predetermined period of time. Accordingly, a period required before the cumulative period of time for determining the state of the PSK-modulated wobble signal reaches the predetermined period of time is monitored, and if the cumulative period of time does not reach the predetermined period of time after a certain period of time passes since the start of the accumulation of the period of the HIGH or LOW state of the binary wobble signal, it is determined that the starting of the accumulation has been caused by the noise generated by the phase inversion, and the cumulative period of time is reset. Thereby, the noise can be eliminated from the binary wobble signal.

According to the configuration of this embodiment, when the binary wobble signal supplied from the pulse signal generation part 54 is switched to HIGH after the clear state of the high gate counter 64 is canceled, the high gate counter 64 starts to count the number of pulses of the reference clock signal. From that point, the counter 74 also starts to count 16 reference clock pulses. Under this condition, if the predetermined period of time passes before the high gate counter 64 counts eight reference clock pulses, the high gate counter 64 is cleared (the count value thereof is set to zero) when the counter 74 counts 16 reference clock pulses. Likewise, when the binary wobble signal supplied from the pulse signal generation part 54 is switched to LOW after the clear state of the low gate counter 80 is canceled, the low gate counter 80 starts to count the number of pulses of the reference clock signal. From that point, the counter 88 also starts to count 16 reference clock pulses. Under this condition, if the predetermined period of time passes before the low gate counter 80 counts eight reference clock pulses, the low gate counter 80 is cleared (the count value thereof is set to zero) when the counter 88 counts 16 reference clock pulses.

That is, if the cumulative period of time of a state of the binary wobble signal does not reach the predetermined period of time after a certain period of time passes since the accumulation of the period of the state of the binary wobble signal is started by the rising to HIGH or falling to LOW (that is, the polarity inversion) of the binary wobble signal, the cumulative period of time is reset. If noise resulting from phase inversion is generated as a result of binarizing the PSK-modulated wobble signal, the binary wobble signal is maintained to HIGH or LOW as normally for a period of approximately half of its cycle after the generation of the noise. Therefore, when the accumulation of the period of the HIGH or LOW state of the binary wobble signal is started by the noise generated by the phase inversion, the cumulative period of the state of the binary wobble signal hardly increases after the start of the accumulation.

Accordingly, if the cumulative period of time of the HIGH or LOW state of the binary wobble signal is reset at an appropriately determined time after the start of the accumulation of the period of the HIGH or LOW state of the binary wobble signal is started, detection of the period of each of the HIGH and LOW states of the PSK-modulated wobble signal can be performed without the effect of noise caused by phase inversion even if the accumulation is started by the noise. Thus, according to this embodiment, it is ensured that noise components are eliminated from the binary wobble signal on which noise caused by phase inversion is superimposed. Therefore, the period of each of the HIGH and LOW states of the binary wobble signal can be detected with accuracy.

FIG. 11 is a timing chart of signals for illustrating a method of obtaining the digital demodulated signal from the PSK-modulated signal in the wobble signal processing circuit 36 of this embodiment. In FIG. 11, (a) indicates the waveform of the PSK-modulated wobble signal on a time basis, (b) indicates the waveform of the binary wobble signal generated in the pulse signal generation part 54 on a time basis, (c) indicates the noiseless binary wobble signal generated in the noise elimination part 56 on a time basis, and (d) indicates the waveform of the digital demodulated signal generated in the PSK demodulation part 58 on a time basis.

As a result of binarizing, with a zero level being employed as a threshold, the wobble signal that is PSK-modulated as indicated by (a) of FIG. 11, the binary wobble signal having noise superimposed thereon at the time of switching from LOW to HIGH and from HIGH to LOW and at the time of phase inversion as indicated by (b) of FIG. 11 may be generated. In such a case, by determining that the binary wobble signal is switched to HIGH or LOW when the cumulative period of the HIGH or LOW state of the binary wobble signal reaches a predetermined period of time as indicated by (c) of FIG. 11, noise resulting from the level change can be eliminated. Further, by monitoring a period before the cumulative period reaches the predetermined period of time, noise resulting from the phase inversion can be eliminated. Thus, the noiseless binary wobble signal is generated by eliminating noise components from the PSK-modulated wobble signal in the noise elimination part 56 of the wobble signal processing circuit 36.

The noiseless binary wobble signal is generated in the noise elimination part 56 so as to have proper pulse widths corresponding to the PSK-modulated wobble signal. Therefore, a proper demodulated signal can be generated based on the pulse widths of the noiseless binary wobble signal in the PSK demodulation part 58. Hence, according to this embodiment, the PSK-modulated signal can be demodulated properly into digital data, so that the absolute addresses indicating positions on the tracks of the disk 12 can be detected with accuracy.

In the above-described embodiment, the PSK demodulation part 58 demodulates the input signal in accordance with the routine shown in FIG. 8. However, the present invention is not limited to this configuration, and the PSK demodulation part 58 may demodulate the input signal according to another method. For instance, the demodulation part 58 may demodulate the input signal based on the pulse width of the noiseless binary wobble signal generated in the noise elimination part 56.

Further, in the above-described embodiment, the present invention is applied to the optical disk unit 10 that eliminates noise from the binary wobble signal in the process of demodulating the PSK-modulated wobble signal in order to accurately detect the absolute addresses indicating positions on the tracks of the disk 12. However, the present invention is also applicable to an apparatus that eliminates noise from a binarized signal, particularly, a communication device that demodulates a phase-modulated signal.

The present invention is not limited to the specifically disclosed embodiment, but variations and modifications may be made without departing from the scope of the present invention.

The present application is based on Japanese priority application No. 2001-281778 filed on Sep. 17, 2001, the entire contents of which are hereby incorporated by reference.

What is claimed is:

1. A signal processing circuit for eliminating noise from an input binary signal, the signal processing circuit comprising:
   a measurement part measuring a cumulative period of time of at least one of high-level and low-level states of the input binary signal for a predetermined period of time after a polarity of the input binary signal is inverted; and
   a signal output part outputting at least one of high-level and low-level signals in accordance with the cumulative period of time.

2. The signal processing circuit as claimed in claim 1, wherein:
   said measurement part comprising:
      an accumulation gate part outputting predetermined clock pulses in accordance with the input binary signal;
      an accumulation counter counting a number of the predetermined clock pulses output from said accumulation gate part; and
      an accumulation clear part clearing the counted number of said accumulation counter when the predetermined period of time passes after the polarity of the input binary signal is inverted; and
   said signal output part outputs at least one of the high-level and low-level signals based on the counted number of said accumulation counter.

3. The signal processing circuit as claimed in claim 2, wherein said accumulation clear part comprises:
   a retaining part that is set to a high-level state when the polarity of the input binary signal is inverted;
   a clear gate part outputting the predetermined clock pulses in accordance with a state of said retaining part; and
   a clear counter counting a number of the predetermined clock pulses output from said clear gate part and clearing the counted number of said accumulation counter based on the counted number of said clear counter.

4. The signal processing circuit as claimed in claim 3, wherein said clear counter resets said retaining part to a low-level state and clears the counted number of said clear counter based thereon.

5. The signal processing circuit as claimed in claim 2, wherein:
   said accumulation gate part comprises:
      a first accumulation gate part outputting the predetermined clock pulses only while the input binary signal is set to the high-level state; and
      a second accumulation gate part outputting the predetermined clock pulses only while the input binary signal is set to the low-level state;
   said accumulation counter comprises:
      a first accumulation counter counting a number of the predetermined clock pulses output from said first accumulation gate part; and
      a second accumulation counter counting a number of the predetermined clock pulses output from said second accumulation gate part; and
   said accumulation clear part comprises:
      a first accumulation clear part clearing the counted number of said first accumulation counter when the predetermined period of time passes after the input binary signal rises to the high-level state; and
      a second accumulation clear part clearing the counted number of said second accumulation counter when the predetermined period of time passes after the input binary signal falls to the low-level state.

6. The signal processing circuit as claimed in claim 5, wherein:
   said first accumulation clear part comprises:
      a first retaining part that is set to a high-level state when the input binary signal rises to the high-level state;
      a first clear gate part outputting the predetermined clock pulses in accordance with a state of said first retaining part; and
      a first clear counter counting a number of the predetermined clock pulses output from said first clear gate part and clearing the counted value of said first accumulation counter based on the counted number of said first clear counter; and
   said second accumulation clear part comprises:
      a second retaining part that is set to a high-level state when the input binary signal falls to the low-level state;

a second clear gate part outputting the predetermined clock pulses in accordance with a state of said second retaining part; and a second clear counter counting a number of the predetermined clock pulses output from said second clear gate part and clearing the counted value of said second accumulation counter based on the counted number of said second clear counter.

7. The signal processing circuit as claimed in claim 6, wherein:

said first clear counter resets said first retaining part to a low-level state and clears the counted number of said first clear counter based thereon; and said second clear counter resets said second retaining part to a low-level state and clears the counted number of said second clear counter based thereon.

8. The signal processing circuit as claimed in claim 7, wherein said first and second retaining parts are RS flip-flops.

9. The signal processing circuit as claimed in claim 7, wherein:

said first accumulation counter and said first clear counter are cleared and said first retaining part is reset to the low-level state when said signal output part outputs the high-level signal; and said second accumulation counter and said second clear counter are cleared and said second retaining part is reset to the low-level state when said signal output part outputs the low-level signal.

10. A circuit for demodulating a phase-modulated signal, the circuit comprising:

a binarization circuit converting the phase-modulated signal to a binary signal by using a predetermined level as a threshold;

a measurement part measuring a cumulative period of time of at least one of high-level and low-level states of the binary signal for a predetermined period of time after a polarity of the binary signal is inverted;

a signal generation part generating at least one of high-level and low-level signals in accordance with the cumulative period of time; and a polarity inversion part inverting a polarity of an output signal thereof in accordance with a pulse width of a signal output from said signal generation part.

* * * * *